Aug. 7, 1956  E. S. MacPHERSON  2,757,747
TORSION BAR INDEPENDENT WHEEL SUSPENSION FOR MOTOR VEHICLES
Filed June 18, 1953  2 Sheets-Sheet 2
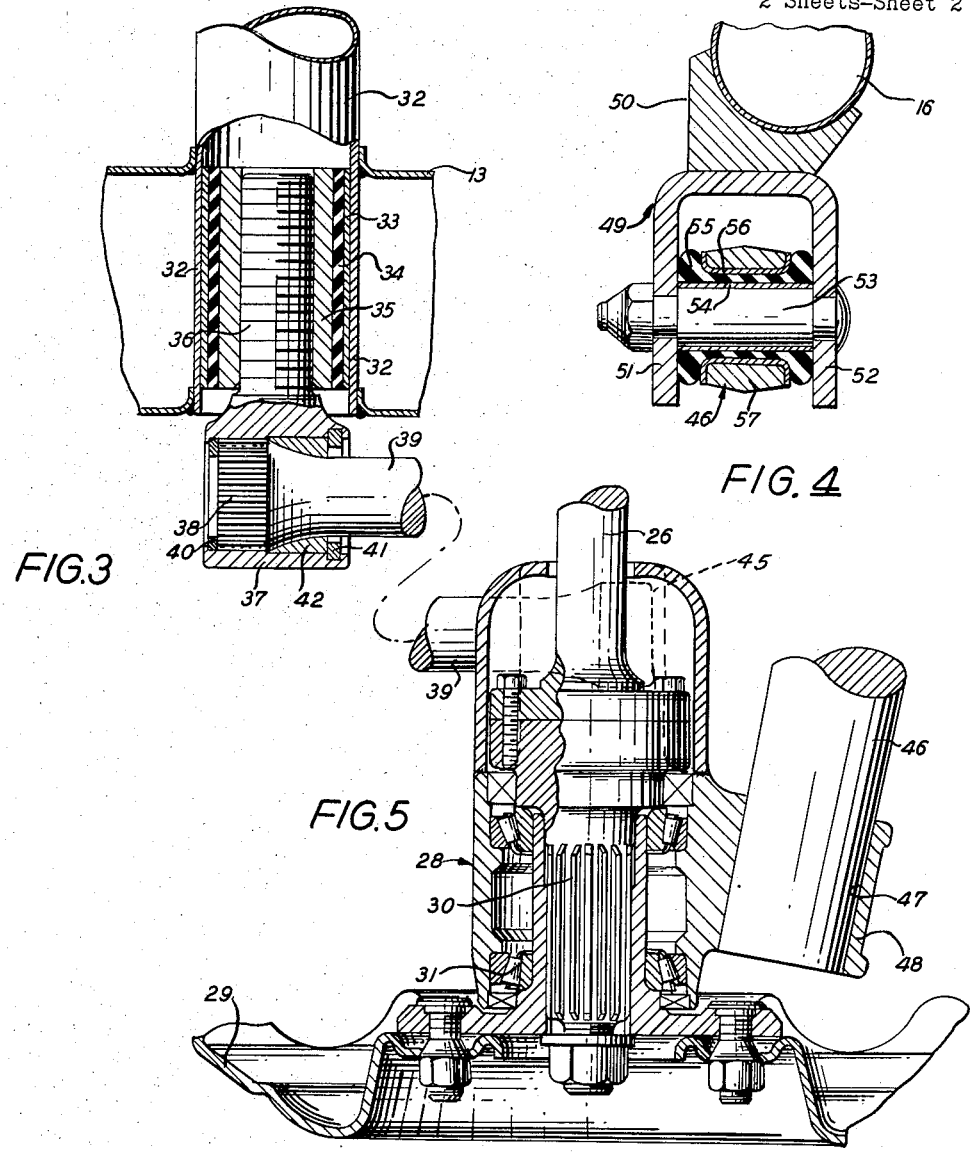
E. S. MacPHERSON
INVENTOR.
BY
ATTORNEYS

United States Patent Office 2,757,747
Patented Aug. 7, 1956

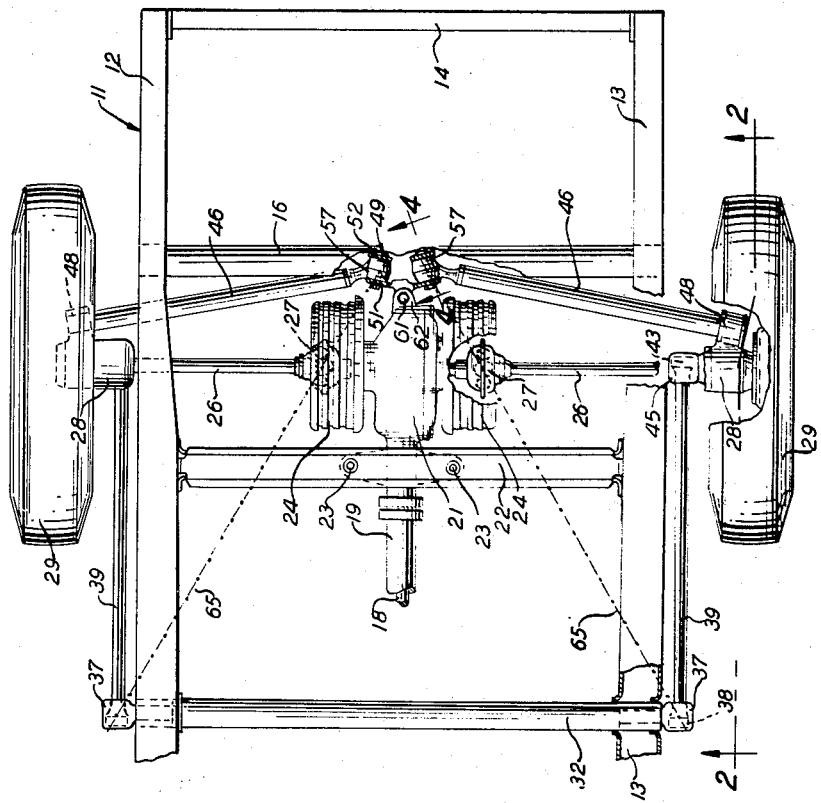

2,757,747

TORSION BAR INDEPENDENT WHEEL SUSPENSION FOR MOTOR VEHICLES

Earle S. MacPherson, Huntington Woods, Mich., assignor to Ford Motor Company, Dearborn, Mich., a corporation of Delaware Application June 18, 1953, Serial No. 362,510

7 Claims. (Cl. 180—73)

This invention relates generally to motor vehicles, and has particular reference to an independent wheel suspension for a motor vehicle.

It is an object of the present invention to provide a motor vehicle wheel suspension in which a torsion bar and a control arm cooperate to guide the rising and falling movement of the vehicle wheel and to take the various loads to which the wheel is subjected, as well as to form the spring suspension therefor. In an embodiment of the invention this is accomplished by providing a generally transversely extending control arm pivotally connected to the vehicle frame at its inner end and rigidly connected to the wheel supporting member at its outer end, and by providing for cooperation therewith a longitudinally extending torsion bar pivotally connected at its forward end to the vehicle frame for pivotal movement about a generally horizontal transversely extending axis and rigidly connected at its rearward end to said wheel supporting member. The arm and bar cooperate to guide the wheel in its rising and falling movements, and the arrangement is such that the bar is torsionally stressed as the wheel rises and falls so as to form the spring suspension for the wheel.

Although the independent suspension system of this invention can be utilized with a vehicle wheel which is not power driven, it is particularly suitable for use in connection with driven wheels such as the rear wheels of a conventional motor vehicle. In this instance the differential and driving gear housing may be mounted directly upon the vehicle frame with power being transmitted to the wheels through axle shafts provided with universal joints. The geometry of the construction may be such that the pivotal connection between the inner end of the control arm and the frame is in alignment with the pivotal connection between the forward end of the torsion bar and the frame and also with the universal connection between the axle shaft and the differential unit. A triangulated system is thus formed, arranged for oscillation about a diagonally extending axis formed by these aligned connections.

Other objects and advantages of this invention will be made more apparent as this description proceeds, particularly when considered in connection with the accompanying drawings, wherein:

Figure 1 is a plan view of the rearward portion of a motor vehicle chassis embodying the present invention.

Figure 2 is a side elevation of the construction shown in Figure 1, partly broken away and in section.

Figures 3, 5 and 6 are enlarged cross sectional views taken on the planes indicated by the lines 3—3, 5—5 and 6—6 of Figure 2.

Figure 4 is an enlarged cross sectional view taken on the plane indicated by the line 4—4 of Figure 1.

Referring now to the drawings, the reference character 11 indicates generally the frame of a motor vehicle having side frame rails 12 and 13 joined at their rearward end by a cross frame member 14. Spaced forwardly of the rear cross frame member 14 is another cross frame member 16 extending generally transversely and secured at its outer ends to the side frame members. The cross frame member 16 is tubular in cross section.

Power from the vehicle engine (not shown) is transmitted through a propeller shaft 18 to conventional differential and drive gearing contained within a central housing 21. The central housing 21 is resiliently supported upon the cross frame member 22 of the vehicle chassis 11 by means of resilient mounts 23.

The differential housing 21 supports conventional brake units 24 on opposite sides thereof. A pair of driven axle shafts 26 are connected by universal joints 27 to the differential and drive gear assembly 21, and extend outwardly to wheel hubs 28 for the rear wheels 29. As best seen in Figure 5, the outer end of each axle shaft 26 is flanged and is bolted to the adjacent flanged end of a stub axle shaft 30 journaled in the hub 28 by means of bearings 31. The stub axle shaft supports the rear wheels 29.

As best seen in Figure 1, the side frame rails 12 and 13 of the vehicle frame are apertured to receive the ends of a tubular cross member 32. The ends of the tubular member extend through the box section side frame rails and are welded thereto. Referring now to Figure 3, each end of the tubular member 32 supports a sleeve 33 which is pressed therein and which in turn contains a rubber bushing 34 and an inner sleeve 35. The inner and outer leaves and the rubber bushing may be assembled by well known methods, as for example compressing the rubber diametrically and extending it axially from its free position in forcing it between the sleeves. The assembly dampens vibrations and permits limited oscillation about the transverse axis of the tubular member 32.

The inner sleeve 35 is internally threaded to receive the threaded shank 36 of a torsion bar end support 37. The end support 37 non-rotatably receives the splined end portion 38 of a longitudinally extending torsion bar 39. The torsion bar 39 is held longitudinally in the end support by means of retaining rings 40 and 41 and sleeve 42. It will be seen that the forward end of the torsion bar 39 is mounted for rotation in a vertical plane about a horizontal transverse axis but is held against bodily movement in a lateral direction.

The rearward end 43 of the torsion bar 39 is splined and non-rotatably received within a stepped bore 44 formed within an integral inwardly and downwardly projecting extension 45 of the wheel hub 28.

Each rear wheel 29 is also provided with a generally transversely extending control arm 46. The outer end of each control arm 46 is received within a bore 47 formed within an integral rearwardly projecting extension 48 of the wheel hub 28, and is welded or otherwise non-rotatably secured thereto.

Adjacent the longitudinal center line of the vehicle the inner ends of the control arms 46 are pivotally connected to an inverted U-shaped bracket 49 secured to a support 50 welded to the under side of the tubular cross frame member 16. As best seen in Figures 1 and 4 the inverted U-shaped bracket has front and rear legs 51 and 52 apertured to receive pivot bolts 53. Supported upon each bolt, in order, is an inner sleeve 54, a rubber bushing 55 and an outer sleeve 56. The outer sleeve 56 receives the apertured and formed inner end 57 of the control arm 46.

With reference to Figures 1 and 2, the bracket 49 is formed with an integral forwardly extending horizontal flange 58 connected by means of a rubber block 59 and a bolt 61 to a rearwardly extending flange 62 integrally formed with the differential housing 21. This construction cooperates with the mounts 23 on the cross frame member 22 to resiliently support the differential housing 21 and brake units 24 on the vehicle frame.

It will be noted that a line 65 joining the center of the connection between the forward end of each torsion bar 39 and the vehicle frame with the center of the pivotal connection between the inner end 57 of the control arm 46 for the same wheel and the bracket 49 on the frame cross member 16 passes through the universal joint 27 between axle shaft 26 and the differential unit 21. Each rear wheel suspension system thus is in the form of a triangle having its base formed by the line 65 between the inner end of the control arm 46 and the forward end of the torsion bar 39, with the torsion bar 39 and the control arm 46 forming the two short sides of the triangle and with the rear wheel 29 supported by the wheel hub 28 at the juncture between the torsion bar and the control arm. The bolt 53 forming the pivotal connection between the control arm 46 and the frame may be inclined as shown with respect to the axis 65, or it may be in alignment therewith.

As a result of this arrangement, rising and falling movement of the rear wheel 29 takes place about the axis 65. With the torsion bar 39 and the control arm 46 substantially horizontal in their normal positions, it will be seen that either rising or falling movement of the rear wheel results in moving the wheel hub 28 inwardly in an arc about the inclined axis 65. Since the forward end 38 of the torsion bar 39 is pivotally connected to the side frame rail 12 for pivotal movement only about the fixed horizontal transversely extending axis of the tubular member 32 it will be apparent that the torsion bar is torsionally stressed as the wheel rises and falls since the rearward end 43 of the torsion bar is rigidly connected to the wheel hub 28 and swings in an arc about the axis 65. Consequently, the torsion bars 39 serve as springs to resiliently and independently suspend the rear wheel. In addition, of course, the torsion bar cooperates with the transversely extending control arm to guide the wheel in a predetermined path during its rising and falling movements. In this regard the torsion bar serves in somewhat the manner of a trailing arm.

Since the universal joint 27 between the rear axle shaft 26 and the differential unit 21 lies on the inclined axis 65 of the suspension it will be seen that it is coordinated with the movement of the torsion bar and the control arm during the rising and falling of the vehicle wheel.

In lieu of using only one universal joint in each axle shaft, two may be used if desired. In this event the inclined axis through the connections at the forward end of the torsion bar and the inner end of the control arm need not pass through either of the universal joints.

It will be understood that the invention is not to be limited to the exact construction shown and described, but that various changes and modifications may be made without departing from the spirit and scope of the invention, as defined in the appended claims.

What is claimed is:

1. In an independent suspension system for a motor vehicle having a pair of generally parallel longitudinally extending side frame rails interconnected near their rearward ends by a transversely extending cross frame member, a pair of supporting members one adjacent each side frame rail and each having means thereon to rotatably mount a wheel, a pair of longitudinally extending torsion bars one adjacent each side frame rail and extending generally parallel thereto and pivotally connected at its forward end to said rail for pivotal movement about a generally horizontal transverse axis, said torsion bars being rigidly connected at their rearward ends to said wheel supporting members, and a pair of transversely extending suspension arms each rigidly connected at its outer end to one of said wheel supporting members, a pivotal connection joining the inner end of each of said suspension arms to said cross frame member near the longitudinal center line of the vehicle to guide said wheel supporting members during the rising and falling movements of the vehicle wheels in paths imposing torsional bending stresses upon said torsion bars.

2. The structure defined by claim 1 which is further characterized in that the forward end of each of said torsion bars is rigidly secured to a pivot member having a journal extending at right angles to the axis of the torsion bar for pivotal connection to the frame rail, and the rearward end of each of said torsion bars is provided with an end portion non-rotatably secured to the adjacent wheel supporting member.

3. In a motor vehicle having a frame and a driven road wheel, a driving gear unit mounted upon said frame, a supporting member rotatably mounting said road wheel, an axle drivingly connected to said wheel, a universal joint interconnecting said axle and said driving gear unit, a suspension arm extending generally transversely of said vehicle rearwardly of said axle and driving gear unit, said arm being rigidly secured at its outer end to said wheel supporting member and pivotally connected at its inner end to said frame, and a wholly longitudinally disposed one-piece straight torsion bar extending adjacent the frame of said vehicle forwardly of said axle and driving gear unit, said torsion bar being secured at its rearward end to said wheel supporting member and pivotally connected at its forward end to said frame, said last mentioned pivotal connection being about an axis extending generally horizontally and transversely of said vehicle, said suspension arm and said torsion bar forming the sole guiding and supporting means for the rising and falling movements of said road wheels.

4. The structure defined by claim 3 which is further characterized in that said universal joint, the pivotal connection between said suspension arm and said frame, and the pivotal connection between said torsion bar and said frame are all in alignment with each other along a diagonal longitudinally extending line to swing said wheel supporting member generally about this line as the road wheel rises and falls.

5. In a motor vehicle having a frame and a driven road wheel, a driving gear unit mounted upon said frame, a supporting member rotatably mounting said road wheel, an axle drivingly connected to said wheel, a universal joint interconnecting said axle and said driving gear unit, a suspension arm extending generally transversely of said vehicle rearwardly of said axle and driving gear unit, said arm being secured at its outer end to said wheel supporting member and pivotally connected at its inner end to said frame, and a wholly longitudinally disposed one-piece straight torsion bar extending adjacent the frame of said vehicle forwardly of said axle and driving gear unit, said torsion bar being secured at its rearward end to said wheel supporting member and pivotally connected at its forward end to said frame, said universal joint and the pivotal connections between said torsion bar and said frame and said suspension arm and said frame being in alignment with each other along a line extending diagonally of the vehicle frame with the rearward end of said line near the longitudinal center line of the frame, and the pivotal connection between the forward end of said torsion bar and said frame providing for pivotal movement of said torsion bar about an axis other than said diagonal line.

6. In an independent suspension system for a motor vehicle having a pair of generally parallel longitudinally extending side frame rails interconnected near their rearward ends by a transversely extending cross frame member, a pair of supporting members one adjacent each side frame rail and each having means thereon to rotatably mount a wheel, a pair of wholly longitudinally disposed one-piece torsion bars one adjacent each side frame rail said torsion base being pivotally connected at their forward ends to said frame rails for pivotal movement about a common transversely extending axis, each of said torsion bars being rigidly connected at its rearward end to the adjacent wheel supporting member, and a pair of transversely extending suspension arms each rigidly connected at its outer end to one of said wheel supporting members and pivotally connected at its inner end to said cross frame member to guide said wheel supporting members during rising and falling movements of the vehicle wheels in paths imposing torsional stresses upon said longitudinally extending torsion bars.

7. In an independent suspension system for a motor vehicle having a pair of generally parallel longitudinally extending side frame rails interconnected near their rearward ends by a transversely extending cross frame member, a pair of supporting members one adjacent each side frame rail and each having means thereon to rotatably mount a wheel, a pair of longitudinally extending torsion bars one adjacent the outboard side of each side frame rail and extending generally parallel thereto, said torsion bars being pivotally connected at their forward ends to said side frame rails for pivotal movement about a common transversely extending horizontal axis, said torsion bars being rigidly connected at their rearward ends to said wheel supporting members, and a pair of generally transversely extending suspension arms spaced rearwardly of the common transverse axis of said road wheels, each of said suspension arms being rigidly connected at its outer end to one of said wheel supporting members and pivotally connected at its inner end to said cross frame member to guide said wheel supporting members during the rising and falling movements of the vehicle wheels in paths imposing torsional bending stresses upon said torsion bars, said two transversely extending suspension arms and said two longitudinally extending torsion bars forming the sole guiding and supporting means for the rising and falling movements of said two wheels.

References Cited in the file of this patent

UNITED STATES PATENTS

| | | |
|---|---|---|
| 2,133,633 | Rabe et al. | Oct. 18, 1938 |
| 2,164,838 | Porsche | July 4, 1939 |
| 2,256,069 | Wagner | Sept. 16, 1941 |
| 2,334,702 | Newton et al. | Nov. 23, 1943 |
| 2,596,922 | Thoms | May 13, 1952 |